March 29, 1960
G. J. FOSS ET AL
2,930,082
SEALING GASKET COMPOSITION AND METHOD OF MAKING
TUBULAR GASKET STOCK THEREFROM
Filed April 9, 1956
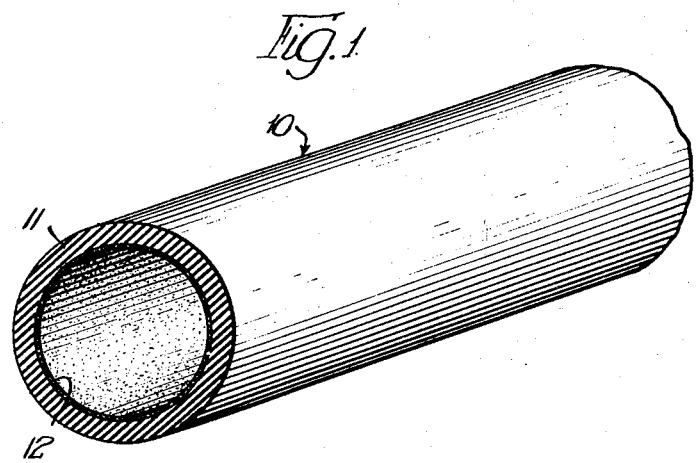
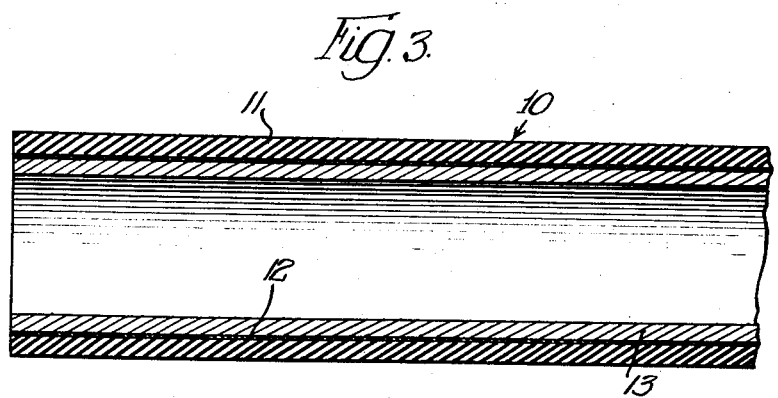
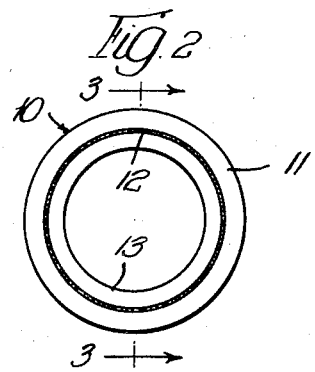
INVENTORS.
George J. Foss,
BY Harold W. Unger,

United States Patent Office 2,930,082
Patented Mar. 29, 1960

2,930,082

SEALING GASKET COMPOSITION AND METHOD OF MAKING TUBULAR GASKET STOCK THEREFROM

George J. Foss, La Grange Park, and Harold W. Unger, Mount Prospect, Ill., assignors, by mesne assignments, to Continental Can Company, Inc., New York, N.Y., a corporation of New York Application April 9, 1956, Serial No. 577,429

8 Claims. (Cl. 18—47.5)

The present invention relates, generally, to an improved butyl rubber sealing gasket composition and method of making lengths of tubular gasket stock therefrom which is capable of exhibiting highly efficient sealing properties, particularly when used in the form of ring gaskets in metal closure caps for glass containers.

The butyl rubber sealing gasket material of the present invention has particular utility in use with closure caps of the pressed-on type for glass and plastic bottles, jars and the like where such closure caps are provided with side-seal gaskets as shown, for example, in Patent No. 2,339,827 to William P. White dated January 25, 1944. It will be understood, however, that while the present invention has particular utility in connection with the provision of gaskets for closure caps of the type referred to, it has other uses.

In accordance with known practices, O-ring sealing gaskets for use in closure caps are sliced from cured lengths of rubber tubing. The tubes are formed by extruding the green rubber formulation, following which it is necessary to lubricate or coat the inner surface of the tubing to prevent the sticking together of opposed surfaces of the collapsible tubing as it comes from the extruder in an uncured, tacky state. Lubrication not only prevents cohesion between opposed surfaces but further allows each length of the tubing to be readily slipped over a mandrel which supports the tubing and controls the inside diameter and shape thereof while being cured. The lubricating substance furthermore permits the tubing to be readily removed from the mandrel following the cure.

A conventional lubricant is a talc composition which is dusted on the inner surface of the tubing following the extrusion thereof. The talc coating provides an interface which prevents the tubular inner face of the tacky green rubber from touching itself to an extent that it will adhere to itself. Attempts to separate adhered portions result in the tearing or disproportionate stretching of the tubing. The use of talc is objectionable because of its general dirtiness as well as the tendency of talc particles to become impregnated in the surface of the rubber tubing. When sealing gasket O-rings are sliced from the cured rubber tubing, the talc cannot be readily or completely removed from the inner surface of the O-rings and the residual talc impairs the sealing qualities of the gaskets.

In an attempt to eliminate the use of talc as a lubricant, numerous materials have been tested as replacements. The substitute materials tested have not been found acceptable for one or more reasons including an excessive vapor pressure, poor lubrication properties, a tendency to carbonize at vulcanizing temperatures or questionable toxicity. Silicone resins in the form of fluids sprayed as a mist upon the inner surface of the uncured tubing, have been found to function exceptionally well as a lubricant for certain butyl rubber formulations while at the same time being incapable of reducing the sealing efficiency. The silicone fluids may be applied to the inner surface of the butyl tubing in the form of a mist either during or following the extrusion of the tubing. These fluid resins have proved to be very good anti-tack agents thereby preventing the rubber from adhering either to itself or the metal mandrel. Excellent results have been obtained from leakage tests wherein gaskets having a silicone coated surface were compared with gaskets lubricated with talc.

While talc lubricant lends itself to use with all of the known butyl rubber compositions and methods of preparing tubings therefrom it has been found that a silicone fluid lubricant is not capable of such a wide application. During the vulcanizing operation, any quantities of air entrapped between the mandrel and the butyl tube expand by reason of the heat applied. The talc particles, being relatively large and hard, form a micro-porous interface between the inner surface of the tubing and the outer surface of the mandrel which allows the air trapped therebetween to flow between the particles and ultimately escape outwardly of the ends of the tubing. The liquid silicone interface, not being granuar, permits the inner surface of the tube to more uniformly contact the outer surface of the mandrel and under generally used vulcanization conditions, small trapped air pockets formed between the mandrel and the tubing cannot be eliminated as before. These pockets result in blister formations in the tubing due to expansion when the tubing is cured. The formation of blisters results in the stock being cured with irregularities including thin spots in the walls. The thin sections and other irregularities are difficult to detect on inspection and result in the production of gaskets subject to failure upon use.

It is an object of the present invention to provide a new and improved butyl rubber sealing gasket composition which, when extruded in the form of an uncured tube, coated with silicone fluid on the inner surface thereof and supported in intimate contact on a mandrel, is capable of maintaining a substantially constant volume without blistering under certain vulcanization conditions.

An additional object is to provide a new and improved method of forming vulcanized tubular rubber gasket stock from which ring gaskets may be sliced, which method includes extruding a properly formulated butyl rubber composition, applying a silicone coating to the interior of the extruded tube, supporting the uncured tube on a mandrel, and vulcanizing the tube under appropriate conditions.

For a more complete understanding of the nature and scope of the invention reference may now be had to the following detailed description thereof wherein certain illustrative examples are set forth and from which other objects not specifically set forth will become apparent.

Reference is also made to the accompanying drawing wherein:

Fig. 1 diagrammatically illustrates an extruded tube of rubber stock having applied to the inner surface thereof a coating of silicone;

Fig. 2 diagrammatically illustrates an end view of a mandrel having the stock received thereon for curing; and Fig. 3 illustrates the mandrel and stock of Fig. 2 in vertical section as viewed along line 3—3 in Fig. 2.

It has been found possible to formulate butyl rubber compositions which when formed into uncured tubing and coated on the interior with silicone fluids are capable of being vulcanized on a mandrel under certain vulcanization conditions without the formation of thin wall spots due to blistering. The compositions entail the use of certain combinations of carbon black of chain-like particle structure and carbon black of substantially discrete, relatively isolated globular particles. The proper compounding of the butyl rubber green stock, in a manner to be described in more detail, allows a subsequently extruded tube internally coated with a silicone fluid mist to be vulcanized in accordance with conventional procedures provided the vulcanization conditions are balanced in conformance with the modulus of the rubber without the formation of thin spots in the tube due to the blistering thereof.

In forming the green butyl rubber composition for subsequent extrusion into tubing, the rubber must be properly reinforced by the inclusion of carbon black of chain-like particle structure and carbon black of substantially discrete, relatively isolated globular particle structure. These two types of carbon black are known and commercially available. For example, Thermax is a carbon black product of Thermatomic Carbon Company which is formed from isolated globule-type carbon black particles while Philblack A is a product of Phillips Chemical Company of Akron, Ohio and is a carbon black containing the chain-like type of particles. The quantities of each form of carbon black present must be regulated with respect to one another as well as with respect to the amount of butyl rubber present to be capable of imparting to the subsequently formed green rubber tubing the ability to withstand blistering under vulcanization conditions which include the above discussed use of a support mandrel after interiorly coating the extruded tubing with silicone fluid. By properly formulating the green stock the resulting uncured rubber tubing is capable of maintaining a substantially constant volume during vulcanization. It has been found preferable to utilize the carbon black components to an extent of about 80 parts by weight total carbon black for every 100 parts by weight of butyl rubber. Furthermore, it has been found preferable to utilize quantities of carbon black of chain-like particle structure to an extent of at least 25 parts by weight for every 100 parts by weight of butyl rubber.

In carrying out the method of the present invention a batch of butyl rubber containing an intimate admixture of quantities of carbon black including chain-like particle structure carbon black and substantially discrete, relatively isolated globular particle structure carbon black, is prepared. The mixing of these ingredients is preferably carried out at a temperature of approximately 400° F. and the agitation applied is maintained for approximately 5 minutes. The resultant mixture is then extruded in a known manner and equipment in the form of a tube 10 as shown in Fig. 1, with the rubber stock identified by the numeral 11, to the interior surface of which a coating 12 of silicone mist is applied in any suitable manner. The tube is then placed on a mandrel 13 of known type proper diameter so as to be in intimate contact therewith and the assembly is subjected to vulcanization conditions. In preventing the formation of blisters during vulcanization, it has been found that the vulcanization temperatures should be maintained within the range of about 200°–400° F. while the gas pressures within the tubing range from about 16.3 to 21.3 p.s.i. gauge. Under these vulcanization conditions blistering or injury to the tubing is avoided when the tube is formed of butyl rubber stock of proper formulation as described above. Following vulcanization the tube may be readily removed from the mandrel due to the lubricating properties of the silicone coating and sliced into sealing gasket O-rings in the known manner. When used in closure caps of the type described, such sealing gaskets provide an excellent seal with the glass finish.

The following examples are illustrative of the foregoing types of butyl rubber compositions and methods of forming the same into O-ring sealing gaskets.

*Example I*

The following ingredients in the amounts set forth which are parts by weight based on 100 parts by weight of butyl rubber were used in compounding a green butyl rubber composition:

| | |
|---|---|
| GRI–25 (butyl rubber product of Enjay Co. of New York, New York) | 100 |
| Polyac (p-dinitroso benzene polymer which is a processing aid of E. I. du Pont de Nemours of Wilmington, Delaware) | 0.5 |
| Sulfur | 1.6 |
| Zinc oxide | 5.0 |
| Stearic acid | 0.75 |
| Philblack A (chain-type carbon black) | 35 |
| Thermax (isolated globule type carbon black) | 50 |
| Clay | 100 |
| Tuads (tetraethyl thiuram disulfide which is an accelerator manufactured by R. T. Vanderbilt Co. of New York, New York) | 1.5 |
| Altax (benzothiazyl disulfide, an accelerator manufactured by T. R. Vanderbilt Co. of New York, New York) | 0.5 |

The Thermax and Philblack A carbon black were mixed with the butyl rubber at a temperature of 400° F. under agitation for approximately 5 minutes. The resultant composition was fed into a tube extruder of known type provided with a spraying arrangement which coated the internal surface of the tube with a 350 centistoke silicone fluid. The continuously extruded tube was cut into lengths of 48 inches and each tube slid onto a mandrel of sufficient outside diameter to provide close contact between the inner surface of the tube and the outer surface of the mandrel. The presence of the silicone allowed the tube to be readily slid onto the mandrel. The mandrel-supported tube was introduced into a curing oven maintained at a temperature of approximately 320° F. The pressure of air trapped between the mandrel and rubber tube was approximately 19.3 p.s.i. gauge upon the bringing up of the tube temperature to oven temperature. Vulcanization continued for approximately 55 minutes whereupon the cured tube was removed from the oven. The tube was then removed from the mandrel during which removal it was noted that there was no sticking of the tube to the mandrel due to the lubricating properties of the silicone fluid. The tube was sliced into a number of O-ring sealing gaskets which were used in closure caps and the caps used for sealing food-containing jars. Upon subsequent testing of the jars over a substantial period of time it was noted that there were no leakers.

*Example II*

Butyl rubber O-ring sealing gaskets were formed from the following green butyl rubber composition:

| | |
|---|---|
| GRI–25 | 100 |
| Polyac | 1 |
| Continex (a semi-reinforcing furnace black manufactured by Continental Carbon Co. of New York, New York) | 50 |
| Thermax | 30 |
| Clay | 80 |
| Zinc oxide | 5 |
| Stearic acid | 2 |
| Sulfur | 1.5 |
| Cumate (copper diethyl dithiocarbonate, an accelerator manufactured by R. T. Vanderbilt Co. of New York, New York) | 1.5 |

The procedure set forth in Example I was followed with the exception that the curing oven was maintained at a temperature of approximately 300° F.

*Example III*

Butyl rubber O-ring sealing gaskets were formed from the following green butyl rubber composition:

| | |
|---|---|
| GRI–25 | 100 |
| Polyac | 0.5 |
| Sulfur | 1.6 |

| | |
|---|---|
| Zinc oxide | 5.0 |
| Stearic acid | 0.75 |
| Wyex (processing channel black manufactured by J. M. Huber Corp. of New York, New York) | 30 |
| Thermax | 50 |
| Clay | 120 |
| Tuads | 1.3 |
| Altax | 0.5 |

The procedure set forth in Example I was followed with the exception that the curing oven was maintained at a temperature of approximately 340° F.

From the foregoing examples it can be readily seen that the particular type of butyl rubber compositions described, when extruded into tubes and coated on the interior with a silicone mist, are capable of withstanding the pressures developed during curing so as to avoid formation of blisters. Furthermore, the presence of the silicone coating eliminates the necessity of cleaning as is required when talc is used to prevent sticking and serve as a lubricant.

The Wyex and Continex carbon black used in Examples II and III respectively are formed from carbon black particles of the same type as contained in Philblack A. The processing aid Polyac used in the formulations was added to the butyl rubber at the beginning of the process to aid in bringing about proper mixing of the various ingredients. The remaining components with the exception of the carbon black ingredients were added following the mixing of the carbon black components with the butyl rubber and just immediately prior to the spraying operation. The particular silicone resin fluid of 350 centistokes is readily obtainable and, for example, is manufactured by Dow Chemical Co. of Midland, Michigan.

While the foregoing examples illustrate the use of silicone fluids of commercial concentrations, it should be understood that liquid silicone in any form is capable of use in obtaining the desired results. Furthermore, emulsions of silicone fluid have been found desirable. An example of a suitable emulsion is that using 350 centistoke silicone fluid, water and an emulsifier, the silicone fluid forming 35% of the total emulsion.

Obviously many modifications and variations of the invention as hereinbefore set forth may be made without departing from the spirit and scope thereof, and therefore only such limitations should be imposed as are indicated in the appended claims.

We claim:

1. A tube of butyl rubber composition, said tube being adapted for use in forming sealing gaskets and being coated on the interior thereof with silicone fluid, said butyl rubber composition containing sufficient quantities of carbon black of chain-like particle structure mixed with carbon black of substantially discrete and relatively isolated globular particles to prevent blistering during vulcanization of said tube on a mandrel-type support.

2. A tube of butyl rubber composition, said tube being adapted for use in forming sealing gaskets and being coated on the interior thereof with silicone fluid, said butyl rubber composition containing carbon black of chain-like particle structure mixed with carbon black of substantially discrete and relatively isolated globular particles, the total amount of carbon black present being approximately 80 parts by weight for every 100 parts by weight of butyl rubber.

3. A tube of butyl rubber composition, said tube being adapted for use in forming sealing gaskets and being coated on the interior thereof with silicone fluid, said butyl rubber composition containing carbon black of chain-like particle structure mixed with carbon black of substantially discrete and relatively isolated globular particles, the total amount of carbon black present being approximately 80 parts by weight for every 100 parts by weight of butyl rubber, said chain-like carbon black being present in quantities of at least about 25 parts by weight for every 100 parts by weight of butyl rubber.

4. A method of forming butyl rubber gasket stock which comprises, mixing butyl rubber with carbon black of chain-like particle structure and carbon black of substantially discrete and relatively isolated globular particle structure in quantities sufficient to prevent blistering of the stock during curing, extruding the resultant mixture in the form of a tube, applying to the interior of said tube a coating of silicone fluid, and vulcanizing said tube on a mandrel-type support at a temperature ranging from about 200° to 400° F.

5. A method of forming butyl rubber gasket stock which comprises, mixing butyl rubber with carbon black of chain-like particle structure and carbon black of substantially discrete and relatively isolated globular particle structure in quantities sufficient to prevent blistering of the stock during curing, said mixing being carried out at about 400° F. for about five minutes, extruding the resultant mixture in the form of a tube, applying to the interior of said tube a coating of silicone fluid, and vulcanizing said tube on a mandrel-type support at a temperature ranging from about 200° to 400° F.

6. A method of forming butyl rubber gasket stock which comprises, mixing butyl rubber with carbon black of chain-like particle structure and carbon black of substantially discrete and relatively isolated globular particle structure in quantities of about 80 parts by weight for every 100 parts by weight of butyl rubber to prevent blistering of the stock during curing, extruding the resultant mixture in the form of a tube, applying to the interior of said tube a coating of silicone fluid, and vulcanizing said tube on a mandrel-type support at a temperature ranging from about 200° to 400° F.

7. A method of forming butyl rubber gasket stock which comprises, mixing butyl rubber with carbon black of chain-like particle structure and carbon black of substantially discrete and relatively isolated globular particle structure in quantities of about 80 parts by weight total carbon black for every 100 parts by weight of butyl rubber to prevent blistering of the stock during curing, said chain-like carbon black being present in quantities of at least about 25 parts by weight for every 100 parts by weight of butyl rubber, extruding the resultant mixture in the form of a tube, applying to the interior of said tube a coating of silicone fluid, and vulcanizing said tube on a mandrel-type support at a temperature ranging from about 200° to about 400° F.

8. A method of forming butyl rubber gasket stock which comprises, mixing butyl rubber with carbon black of chain-like particle structure and carbon black of substantially discrete and relatively isolated globular particle structure in quantities of about 80 parts by weight total carbon black for every 100 parts by weight of butyl rubber to prevent blistering of the stock during curing, said chain-like carbon black being present in quantities of at least about 25 parts by weight for every 100 parts by weight of butyl rubber, said mixing being carried out at about 400° F. for about five minutes, extruding the resultant mixture in the form of a tube, applying to the interior of said tube a coating of silicone fluid, and vulcanizing said tube on a mandrel-type support at a temperature ranging from about 200° to 400° F.

References Cited in the file of this patent

UNITED STATES PATENTS

| 1,528,263 | Peelle | Mar. 3, 1925 |
| 2,526,504 | Rehner et al. | Oct. 17, 1950 |

FOREIGN PATENTS

| 652,557 | Great Britain | Apr. 25, 1951 |